Jan. 6, 1970 W. T. LYNCH 3,488,523
L-NETWORK SWITCHING CIRCUIT
Filed Nov. 18, 1966

INVENTOR
W. T. LYNCH
BY David P. Kelley
ATTORNEY

United States Patent Office 3,488,523

Patented Jan. 6, 1970

3,488,523

L-NETWORK SWITCHING CIRCUIT

William T. Lynch, Summit, N.J., assignor to Bell Telephone Laboratories, Incorporated, Murray Hill and Berkeley Heights, N.J., a corporation of New York Filed Nov. 18, 1966, Ser. No. 595,435
Int. Cl. H03k *17/56*
U.S. Cl. 307—253 7 Claims

ABSTRACT OF THE DISCLOSURE

The invention comprises an L-network switching circuit having variable impedance series and shunt arms. The series circuit, connected between a signal source and load, comprises a transistor which is driven in and out of saturation means connected in its base bias circuit. The shunt circuit, connected between the signal source and ground, comprises a diode whose conduction is controlled by a bias battery and a bias resistor, the latter being connected from the emitter of the transistor to ground.

This invention relates to optoelectronic switching circuits for use, for example, in telephone switching systems.

In a typical space-division telephone switching system, such as a toll switching office, switching devices form the crosspoints of a matrix interconnecting signal sources and loads. The switching devices might typically be electromechanical relays, and the matrix might typically interconnect voice modulated carrier signals to coaxial lines which in turn are connected to other toll switching offices.

The fundamental technical requirement of the crosspoint switch is that it should have well-defined and completely distinguishable ON (conducting) and OFF (nonconducting) states. Typically, for telephone circuit switching, the impedance of the crosspoint switch in the OFF state should be in excess of $10^6$ ohms and in the ON state of the order of one ohm or less. These impedance requirements imply that the crosspoint switch should provide substantially complete isolation in the OFF state, and low loss in the ON state, between the source and load it interconnects.

In order to avoid crosstalk problems substantially complete isolation is also desirable between the switch and its control unit (e.g., between the contacts and coil of a relay). Most electromechanical devices, including the relay, are generally deficient, at least to some extent, in this respect. To achieve isolation physical separation of the relay contacts from one another and from the coil is necessary. Capacitance between the contacts and the coil, however, provides a leakage path to ground for signal energy, resulting in interference (i.e., crosstalk) with other relays connected to the common ground. In general this capacitance problem is exaggerated in the transmission of high frequency carrier signals unless expensive modifications in the relay structure are made. In addition, the high frequency modifications and the physical separation required to achieve isolation both mean that relays occupy considerable space, and are not therefore very compact. Aside from crosstalk problems, however, relays generally suffer from a lack of long-term reliability as well.

As subsidiary requirements, it is preferable that the transition (i.e., switching time) from OFF to ON and vice versa should take no more than 1 millisecond and preferably considerably less. The switching time of a relay in general is limited to the millisecond range by the inertia of its mechanical parts. In addition the crosspoint switch should be low in cost, need little maintenance, and consume little operating power.

It is the primary object of this invention to provide substantially complete isolation in the OFF state, and low loss in the ON state, between a source and a load.

It is another object of this invention to provide substantially complete isolation between the switching device and its control unit.

It is a further object of this invention to switch signals rapidly between a source and a load.

Yet another object of this invention is to switch high frequency signals between a source and a load.

In accordance with one embodiment the invention comprises an L-network circuit which is designed to switch, for example, a one megahertz signal into a 50 ohm load, the typical characteristic impedance of a coaxial cable, and to give about 80 db isolation between signal source and load.

The L-network includes a variable impedance series and shunt circuit. The series circuit, connected between the signal source and load, comprises a transistor which is driven in and out of saturation via a photoconductor (or phototransistor) connected in its base-bias circuit. The emitter of the transistor is connected to the signal source, and the collector to the load. The shunt circuit, connected between the signal source and ground, comprises a diode whose conduction is controlled by a bias battery and a bias resistor, the latter being connected from the emitter of the transistor to ground.

The operation of the circuit is essentially as follows, The ON-OFF state of the switch is controlled by the photoconductor connected in the base circuit of the transistor. The impedance of the photoconductor is in turn controlled by an electroluminescent diode which may be activated by a D.C. signal from an appropriate control unit. The control unit typically comprises a computer which first determines which crosspoint switch in a matrix is to be closed, and subsequently transmits the D.C. signal to that switch to effect closure.

In the OFF state the photoconductor is in its high impedance state (no light from the electroluminescent diode), the transistor in the series circuit is in its low conduction state, and the diode in the shunt circuit is forward biased by the battery into its high conduction state. Signals from the source are therefore shunted through the diode to ground. Substantially complete isolation (about 80 db) between source and load is attainable and can be increased by the insertion of a low capacitance (0.5 pf.) diode in the collector circuit of the transistor, if necessary.

On the other hand, in the ON state the photoconductor is switched to its low impedance state by a D.C. signal applied from the control unit to the electroluminescent diode, and the transistor is driven into a low impedance saturation state. The current which subsequently flows in the emitter circuit of the transistor produces a voltage drop across the bias resistor in the shunt circuit sufficient to bais the diode into its low conduction state. Consequently signals from the source pass through the transistor to the load rather than through the diode to ground. The signal loss in the ON state is low, of the order of 0.1 db.

Substantially complete isolation is provided between the electroluminescent diode and the photoconductor (i.e., between the switch and control unit) because the control signal is incorporated in a light path. Consequently there is little signal leakage from the photoconductor to the diode because the capacitive coupling therebetween can be as low as 0.01 pf., representing an impedance of approximately 16 megohms at 1 mHz.

With the use of the photoconductor the switching time of the invention is limited to the millisecond range, the time required for the photoconductor to change its impedance state. The switching time is reduced to the microsecond range by the use of a phototransistor instead of a photoconductor.

The invention, of course, possesses all the well-known advantages of semiconductor devices including compactness, long-term reliability, low operating power requirements (diode drive current about 10 ma.), and furthermore is capable of switching signals at frequencies in the megahertz range.

The above and other objects of the invention, together with its various features and advantages, can be easily understood from the following more detailed discussion, taken in conjunction with the accompanying drawings in which.

Figure 1:
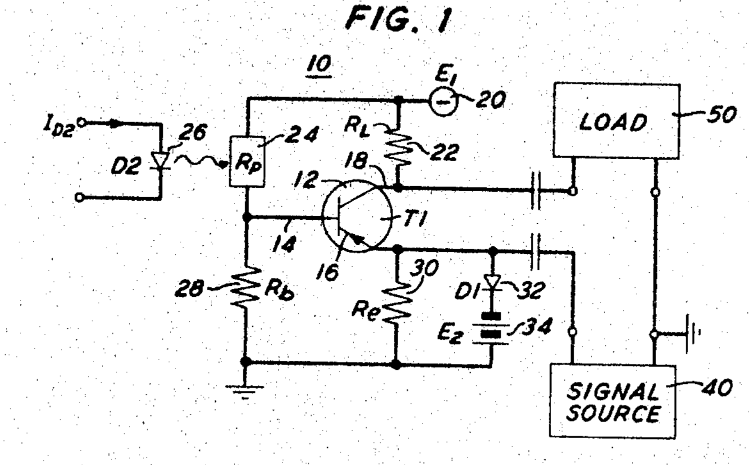
FIG. 1 is a schematic of one embodiment of the invention.

Turning now to FIG. 1, the L-network switching circuit 10 comprises a pnp transistor 12 having base, emitter and collector electrodes, 14, 16 and 18, respectively. The transistor 12 alternatively could be of the npn type, if so desired. Connected between the collector 18 and a source of negative voltage 20 is a resistor 22. A photoconductor 24, which is optically coupled to an electroluminescent diode 26, is connected between the negative voltage source 20 and the base 14, which is in turn connected through a resistor 28 to ground. The emitter 16 is grounded through a bias resistor 30 which is in parallel with the series combination of a diode 32 and a battery 34. In order to bias the diode into its high conduction state in the absence of emitter current, the negative side of the battery 34 is connected to the cathode of the diode 32. A signal source 40 is connected between the emitter 16 and ground, and a load 50 is connected between the collector 18 and ground.

The L-network comprises a variable impedance series and shunt circuit. The series circuit, which is connected in series between the signal source 40 and the load 50, includes the transistor 12 and photoconductor 24. The shunt circuit, which is connected in parallel with the signal source 40, comprises the resistor 30, the diode 32 and battery 34. When the series circuit is in its high impedance state, the shunt circuit is in its low impedance state, and the switch is OFF, signal energy passing through the shunt circuit to ground. On the other hand, when the series circuit is in its low impedance state, the shunt circuit is in its high impedance state, and the switch is ON, signal energy passing through the series circuit to the load 50.

In operation, the electroluminescent diode 26, which is coupled to the photoconductor 24, directly controls the impedance of the series circuit which in turn controls the impedance of the shunt circuit. In the OFF state, when no D.C. control signal is applied to the electroluminescent diode 26, no photon emission takes place and consequently the photoconductor 24 is in its high impedance state, typically 10 megohms or larger. Because the voltage drop across the resistor 28 is less than that across the bias resistor 30, the emitter 16 is reverse biased and the transistor 12 is effectively nonconducting. Because little emitter current flows, the voltage drop across bias resistor 30 is smaller than the voltage of battery 34 and diode 32 is forward biased into its high conduction state, characterized typically by a low impedance of about 5 ohms.

Figure 2:
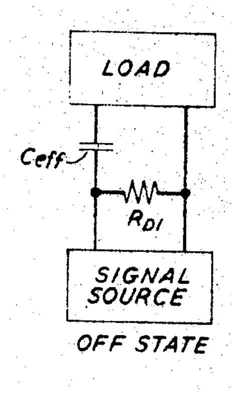
FIG. 2 is a schematic of an equivalent circuit of the invention of FIG. 1 in the OFF state.

The approximate OFF state equivalent circuit is shown in FIG. 2. The equivalent series circuit is the effective emitter to collector capacitance $C_{eff}$ of the transistor 12. $C_{eff}$ is typically about 5 pf. The equivalent shunt circuit is the forward resistance $R_{D1}$ of the diode 32, typically about 5 ohms. At a signal frequency of 1 mHz., the impedance of $C_{eff}$ is approximately 30 kilohms, and one can readily appreciate that virtually all of the signal energy from source 40 will pass through $R_{D1}$ of diode 32 to ground rather than through $C_{eff}$ of the transistor 12 to the load 50, thus providing substantially complete isolation (about 80 db) between source and load.

In the ON state, when a D.C. control signal (about 10 ma.) is applied to the electroluminescent diode 26, the resulting photon emission switches the photoconductor 24 to a low impedance state (in the order of 50 kilohms). The voltage drop across the resistor 28 increases above the drop across bias resistor 30, forward biases the emitter 18, and drives the transistor 12 into saturation. The emitter saturation current flows through the bias resistor 30, increasing the voltage drop across resistor 30 above the voltage of battery 34 so as to bias diode 32 into its low conduction state, characterized by approximately 0.5 pf. capacitor.

Figure 3:
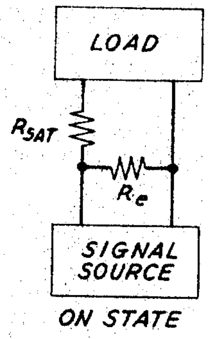
FIG. 3 is a schematic of an equivalent circuit of the invention of FIG. 1 in the ON state.

FIG. 3 shows the approximate ON state equivalent circuit. The equivalent series circuit is the effective emitter to collector saturation resistance $R_{sat}$, of the order of 2 ohms. The equivalent shunt circuit is $R_e$, the bias resistor 30, typically about 250 ohms. Low loss, less than 0.1 db, is provided since nearly all of the signal energy from source 40 passes through $R_{sat}$ of transistor 12 to the load 50, rather than through $R_e$ to ground.

Figure 4:
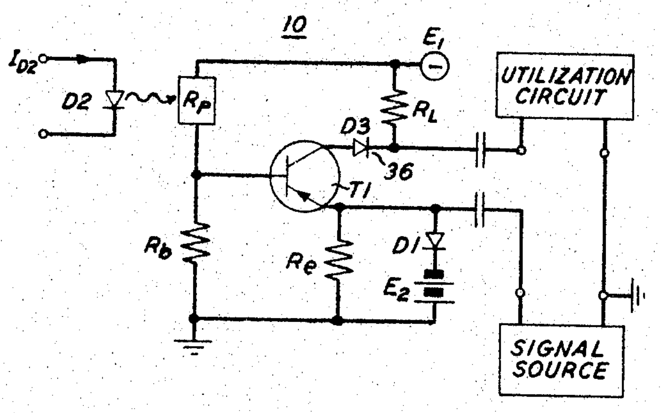
FIG. 4 is a schematic of a second embodiment of the invention.

The isolation provided by switching circuit 10 can be increased, as shown in FIG. 4, by the insertion in the series circuit of low capacitance diode 36 in the collector circuit of transistor 12. When the switch is ON, diode 36 is forwarded biased and is equivalent to approximately a one ohm resistor. It does not, therefore, appreciably attenuate the signals passing through the transistor 12. When the switch is OFF, however, diode 36 is only slightly forward biased and appears as a high resistance (megohms) in parallel with an equivalent capacitance; that is, its junction capacitance $C_o$, about 0.5 pf. The diode 36 decreases the total series capacitance, increases the impedance of the series circuit, and therefore increases the isolation between source and load.

Isolation between the electroluminescent diode 26 and the photoconductor 24 (i.e., between the control unit and the switch) is maintained substantially complete inasmuch as the capacitive coupling therebetween can be as low as 0.01 pf. If, for instance, a control unit, controlling several switches 10, has little or no isolation between the individual electroluminescent diodes 26, then very little signal energy passing through the photoconductor 24 of one switch would be coupled through the common control to another switch.

The switching time (i.e., transition from OFF to ON and vice versa) of the switch shown in both FIGS. 1 and 4 is in the order of milliseconds, being limited by the speed at which the impedance of the photoconductor 24 can be switched. The switching time is decreased to the micro-second range by use of a phototransistor in place of the photoconductor 24.

In the design of the switching circuit 10 it is desirable that certain criteria be satisfied. In the OFF state, in order that little signal energy reach the load, the values of $E_2$, $R_e$ and $R_L$ are preferably chosen such that $$R_{D1} \approx \frac{.025 R_e}{E_2 - V_f} + R_s \ll Z_L \tag{1}$$

where $R_{D1}$=forward resistance of diode 32; $R_s$ is the contribution to $R_{D1}$ from the series resistance of the substrate and contacts of diode D1 (typically 2 ohms); $V_f$=forward voltage drop across diode 32; and $Z_L$ is the input impedance of load 50 (assumed equal to the input impedance of source 40). In the ON state, in order that most of the signal be transmitted to the load, $R_e$, the emitter resistor 30, and $R_L$, the collector resistor 22, should be greater than the load impedance $$R_L > Z_L \tag{2}$$

$$R_e > Z_L \tag{3}$$

The exact component values chosen depend of course on the particular design specifications; that is, how much current leakage can be tolerated to the load in OFF state, and to $R_e$ and $R_L$ in the ON state.

The triggering threshold (i.e., the current through the electroluminescent diode 26 necessary to saturate the transistor 12) can be adjusted by varying the bias battery $E_2$ and/or the base resistor $R_b$. Increasing $E_2$ raises the triggering threshold (and also decreases $R_{D1}$), whereas increasing $R_b$ lowers the threshold. However, in order that transistor 12 be reverse biased in the OFF state, $R_b$ must be such that $$\frac{R_b}{R_b+R_p}E_1<E_2-V_f \quad (4)$$

where $R_p$ is the high resistance of photoconductor 24.

The saturation resistance $R_{sat}$ is a function of the D.C. saturation current through transistor 12. The maximum saturation current is $E_1/(R_L+R_e)$ which would be available only if $R_{sat}$ were zero. However, since $R_{sat}$ is of the order of several ohms, $E_1$, $R_L$ and $R_e$ should be chosen such that $$\frac{E_1}{R_L+R_e}\geq I_{sat} \quad (5)$$

where $I_{sat}$ is the desired saturation current.

A typical set of component values suitable for switching a 1 mHz. signal into a 50 ohm load and for providing about 80 db isolation between source and load is listed below:

| | | |
|---|---|---|
| $R_L$ | ohms | 250 |
| $R_p$: | | |
| High | do | 10,000,000 |
| Low | do | 50,000 |
| $R_b$ | do | 10,000 |
| $R_e$ | do | 250 |
| $R_{D1}$, forward | do | 5 |
| $R_{sat}$ | do | 2 |
| $E_1$ | volts | 20 |
| $E_2$ | do | 3 |
| $C_{eff}$ | pf | 5 |
| $C_o$ | pf | 0.5 |

The electroluminescent diode 26 is typically a diode which emits light in the near infrared at an intensity proportional to the current through the diode.

The diode 36 is typically a thin wafer Si p-i-n diode having junction capacitance $C_o$ about 0.5 pf.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

In particular, it is feasible to integrate the electroluminescent diode and the photosensitive element in a unitary assembly. Similarly, where a number of switching circuits are desired, it is feasible to provide an array of electroluminescent diodes and/or photosensitive elements in monolithic form. Additionally, it is feasible to fabricate one or more of the circuit elements in integrated circuit form.

What is claimed is:

1. A switching circuit for interconnecting a signal source and a utilization circuit comprising, in combination, first variable impedance means adapted to be connected in series between said source and said utilization circuit, said first means comprising a transistor having emitter, base, and collector regions, said emitter region adapted for being connected to said source and said collector region adapted for being connected to said utilization circuit, second variable impedance means connected in shunt between said emitter region and ground, said second means comprising a first device having a high and a low impedance state, biasing means for biasing only said first device into its low impedance state whereby signals from the source are shunted through said first device to ground, means connected between said base and collector regions for saturating said transistor in response to an applied control signal, and means responsive to emitter current to bias only said first device into its high impedance state, whereby signals from said source pass through said transistor to said utilization circuit.

2. The switching circuit of claim 1 wherein:

said first variable impedance means also comprises a second device having a high and a low impedance state, said second device connected between said collector and said utilization circuit to increase the impedance of said first variable impedance means in its high impedance state.

3. The switching circuit of claim 1 wherein:

said biasing means for biasing said first device comprises a first source of voltage connected between said first device and ground to bias said device into its low impedance state in the absence of emitter saturation current, whereby signals from the source pass through said first device to ground.

4. The switching circuit of claim 1 wherein:

said means responsive to emitter current camprises a resistor connected in parallel with said first device to bias said first device into its high impedance state in the presence of emitter saturation current, whereby signals from said source pass through said transistor to said utilization circuit.

5. The switching circuit of claim 4 wherein:

said saturating means comprises:

a second source of voltage, photoconductive means connected between said base of said transistor and said second source of voltage, and an electroluminescent diode for actuating said photoconductive means.

6. The switching circuit of claim 5 wherein:

said photoconductive means comprises a photoconductor.

7. The switching device of claim 5 wherein:

said photoconductive means comprises a phototransistor.

References Cited

UNITED STATES PATENTS

| | | | |
|---|---|---|---|
| 2,812,445 | 11/1957 | Anderson | 307—311 XR |
| 2,986,659 | 5/1961 | Ioakimidis | 307—253 |
| 3,153,729 | 10/1964 | Leakey | 307—253 |
| 3,333,106 | 7/1967 | Fischer | 307—311 XR |
| 3,366,803 | 1/1968 | Soffel et al. | 307—254 |

DONALD D. FORRER, Primary Examiner

STANLEY D. MILLER, Assistant Examiner

U.S. Cl. X.R.

250—214; 307—237, 311